US009316137B2

(12) United States Patent
Tufail et al.

(10) Patent No.: US 9,316,137 B2
(45) Date of Patent: Apr. 19, 2016

(54) METHOD OF OPERATING A DIESEL ENGINE SYSTEM HAVING LNT AND SCR AFTERTREATMENT DEVICES (71) Applicant: Ford Global Technologies, LLC, Dearborn, MI (US)

(72) Inventors: Khizer Tufail, London (GB); Mark Stephen Brogan, Duxford (GB); Haiwen Song, Laindon (GB); Martin John Ledger, Romford (GB); Peter Graham Eastwood, Laindon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/104,963

(22) Filed: Dec. 12, 2013

(65) Prior Publication Data

US 2014/0157760 A1 Jun. 12, 2014

(30) Foreign Application Priority Data

Dec. 12, 2012 (GB) .................................. 1222302.0
Oct. 25, 2013 (GB) .................................. 1318912.1

(51) Int. Cl.
*F01N 3/00* (2006.01)
*F01N 3/10* (2006.01)
(Continued)

(52) U.S. Cl.
CPC .............. *F01N 3/208* (2013.01); *F01N 3/0814* (2013.01); *F01N 3/0842* (2013.01); *F01N 3/2073* (2013.01); *F01N 9/00* (2013.01);
(Continued)

(58) Field of Classification Search
CPC ..... F01N 3/208; F01N 3/2073; F01N 3/0842; F01N 9/00; F01N 2430/00; F01N 2900/08; F02D 41/0057; F02D 41/0235; F02D 41/1461; F02D 41/3035; F02D 41/3064; F02D 41/401; F02D 41/402; F02D 41/3076; Y02T 10/24; Y02T 10/44; Y02T 10/47
USPC ........................... 60/274, 285, 295, 297, 301
See application file for complete search history.

(56) References Cited

U.S. PATENT DOCUMENTS 7,197,867 B2 * 4/2007 Huang et al. .................... 60/295
7,946,109 B2   5/2011 Potter et al.
(Continued)

FOREIGN PATENT DOCUMENTS

GB           2375059       * 11/2002
WO      2006041545 A2        4/2006
WO      2011011460 A2        1/2011

OTHER PUBLICATIONS

IPO Patents Directorate Office, Search Report of GB1222302.0, May 3, 2013, Great Britain, 5 pages.

*Primary Examiner* — Jesse Bogue
*Assistant Examiner* — Diem Tran
(74) *Attorney, Agent, or Firm* — Julia Voutyras; Alleman Hall McCoy Russell & Tuttle LLP (57) ABSTRACT A method of operating a diesel engine 10 having LNT 11 and SCR 13 aftertreatment devices arranged in series to receive exhaust gas from the engine is disclosed in which the engine is operated in a rich early injection mode to generate ammonia in the LNT for storage in the SCR located downstream from the LNT. This reduces the amount of soot produced permitting longer operation of the engine in rich early injection mode and further may reduce the use of PGM material in the LNT and increase the amount of ammonia for use in the SCR.

7 Claims, 9 Drawing Sheets (51) Int. Cl.
    *F01N 3/20*     (2006.01)
    *F02M 25/07*    (2006.01)
    *F01N 3/08*     (2006.01)
    *F02D 41/00*    (2006.01)
    *F02D 41/02*    (2006.01)
    *F02D 41/14*    (2006.01)
    *F02D 41/30*    (2006.01)
    *F02D 41/40*    (2006.01)
    *F01N 9/00*     (2006.01)

(52) U.S. Cl.
    CPC ....... *F02D 41/0057* (2013.01); *F02D 41/0235* (2013.01); *F02D 41/0275* (2013.01); *F02D 41/1461* (2013.01); *F02D 41/3035* (2013.01); *F02D 41/3064* (2013.01); *F02D 41/3076* (2013.01); *F02D 41/401* (2013.01); *F02D 41/402* (2013.01); *F02M 25/07* (2013.01); *F01N 2430/00* (2013.01); *F01N 2900/08* (2013.01); *F01N 2900/1614* (2013.01); *F02D 2200/0802* (2013.01); *Y02T 10/24* (2013.01); *Y02T 10/44* (2013.01); *Y02T 10/47* (2013.01)

(56) References Cited

U.S. PATENT DOCUMENTS

| | | |
|---|---|---|
| 7,992,377 B2 | 8/2011 | Brown |
| 2004/0076565 A1 | 4/2004 | Gandhi et al. |
| 2007/0110650 A1 | 5/2007 | Pfeifer et al. |
| 2008/0066456 A1 | 3/2008 | Schmieg et al. |
| 2011/0179778 A1 | 7/2011 | Durrett |

* cited by examiner

Prior Art

METHOD OF OPERATING A DIESEL ENGINE SYSTEM HAVING LNT AND SCR AFTERTREATMENT DEVICES

CROSS REFERENCE TO RELATED APPLICATIONS

The present application claims priority to Great Britain Patent Application No. 1222302.0, filed on Dec. 12, 2012, and Great Britain Patent Application No. 1318912.1, filed on Oct. 25, 2013, the entire contents of each of which are hereby incorporated by reference for all purposes.

BACKGROUND/SUMMARY

To reduce NOx emissions formed during the operation of a diesel engine two methods are employed. A lean NOx trap (LNT) uses Platinum Group Metals (PGM) to adsorb NOx gases on alkali earth oxide materials. The LNT can also generate ammonia (NH3) during rich operation. A selective catalytic reduction device (SCR), which includes a reductant such as NH3, reduces NOx in an oxygenated environment. An external source of NH3, for example a urea solution tank, may be used with a SCR.

One approach is to employ LNT and SCR in series. During primary operation of the engine using lean stratified diesel combustion (lean) the NOx emissions are adsorbed as nitrates by the LNT. However, the engine may be run using rich stratified diesel combustion (rich) periodically to purge the stored nitrates. The LNT may produce NH3 during this phase that can be adsorbed by the SCR to reduce NOx during the next lean run. This combination reduces the need for the external NH3 source.

Some of the problems recognized by the inventors with such a set-up come from running in the rich phase. Running for more than a few seconds in the rich phase produces soot which fills the diesel particulate filter (DPF). High exhaust temperatures, 600-650° C., to regenerate the DPF deteriorates the fuel consumption of the engine. Running for only a few seconds in the rich phase may need high PGM loading on the LNT which increases cost. This also limits the amount of NH3 that can be produced and impacts the performance of the SCR device downstream.

To at least partially address these problems one example includes a method of switching between lean and rich combustion modes where the rich mode is operated using a rich early injection combustion mode (REI), such as premixed charge compression ignition, PCCI. This method may further use lean early injection combustion (LEI) for the lean mode. In this way it is possible to improve the efficiency of the LNT and SCR devices.

In another example, a method of operating a diesel engine system having LNT and SCR aftertreatment devices arranged in series to receive exhaust gas from the engine wherein the method comprises operating the engine in lean and rich combustion modes, switching between the lean combustion mode and the rich combustion mode based upon the operating requirements of the LNT and the SCR to minimise NOx emissions from the engine and using a rich early injection combustion mode when the engine is operating in the rich combustion mode.

In another example, an engine control method includes operating the engine during a first lean stratified combustion mode and operating the engine during a second ammonia generation mode with repeated lean stratified combustion and rich stratified combustion and further operating the engine during a third ammonia generation mode, including repeated lean pre-mixed compression ignition and rich pre-mixed compression ignition. The repeated lean and rich operation in the second and third modes may include switching between lean and rich conditions without stoichiometric operation therebetween. Further, the rich stratified combustion during the second mode may be for a shorter duration than the rich pre-mixed compression ignition combustion of the third mode, even though the lean operation of the second and third modes is comparable (e.g., equal in one example). Further, the duration of the rich combustion in the third mode may be adjusted differently responsive to ammonia storage and/or generation amounts in the exhaust system than the rich combustion in the second mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Two methods may be used to reduce NOx emissions are the use of a LNT (lean NOx trap) and a SCR (selective catalytic reduction) with a reductant such as Ammonia (NH3). Both methods have their advantages and drawbacks.

A LNT catalyst uses PGM (Platinum Group Metals), principally Pt, Pd and Rh, as a catalytic component, which is dispersed on a high surface area support. At normal diesel engine exhaust gas temperatures, and under oxygen excess environment, the LNT will adsorb NOx gases on support alkali earth oxide materials that are well established in the art. After a period of time those adsorptions sites become saturated, with a consequent reduction in the mass of NOx being removed, therefore to continue to remove NOx from the gas phase a rich purge is required. This is an oxygen deficient environment, in which the alkali earth oxide becomes unstable at a much lower temperature. This liberates NO2 and NO, which readily react in the same environment with HC (unburnt hydrocarbons), CO and H2 to form N2, H2O and CO2.

The LNT can be an expensive component due to the high PGM loading and in particular the high loading of Rhodium.

A SCR reduces NOx within a wide temperature range and in an oxygenated environment. A SCR does not require PGM components and is therefore less expensive. However, the SCR needs an additional reductant like ammonia, which in known systems has been supplied by way of dosing with Urea from a reservoir. The Urea decomposes in the exhaust stream to form ammonia. Hence, the implementation of a conventional SCR requires additional infrastructure and equipment to supply each vehicle with urea or ammonia. The Urea hydrolysis requires a minimum temperature of 180° C.

During rich operation the LNT may generate NH3 through unwanted side reactions. The ammonia is an emission which must also be controlled. One approach is to use a combined LNT/SCR aftertreatment system in which the SCR catalyst is installed downstream of the LNT catalyst. This could add some NOx removal capability to the system as well as minimize NH3 tailpipe emissions.

During operation of the engine system the engine is operated primarily using lean combustion, enabling economical running of the engine. During this phase, the NOx emissions are adsorbed by the LNT catalyst as nitrates as previously discussed. However, the engine must be run rich periodically for the LNT to remove (purge) the stored nitrates and this purging process produces Ammonia (NH3). The NH3 produced in the LNT can be adsorbed in the SCR located downstream rather than emitted as would otherwise be the case. This adsorbed NH3 is subsequently used by the SCR to reduce NOx during the next lean combustion period.

Such a combined LNT and SCR configuration therefore reduces the need for an external NH3 source such as, for example, a urea solution tank that is necessary in the case of a stand-alone SCR. It also contains the risk that ammonia will be formed by the LNT and then emitted.

There are however a number of issues associated with such prior art combined LNT/SCR systems.

Firstly, because of the production of soot when a diesel engine is operated rich, the time period during which the engine can be run rich has to be limited to a few seconds. This is because soot is an undesirable product of combustion. Therefore to meet current and proposed emission regulations most diesel applications include the use of a diesel particulate filter (DPF) to remove soot from the exhaust gas. It is therefore a problem if the amount of soot produced by an engine is increased due to rich running because the DPF will fill rapidly and require regenerating. The regeneration of a DPF includes the temperature of the exhaust gas being increased to a high temperature such as 600-650° C. and to do this additional fuel is required thereby deteriorating the fuel consumption of the engine.

Therefore, because the engine can only be run rich periodically for a very short period of time, the PGM loading of the LNT and, in particular, the Rhodium loading adds significantly to the cost of the vehicle. In addition, the amount of NH3 that can be produced in such a short period of time, during rich operation, is relatively small thereby restricting the amount of NOx that can be reacted with it to produce diatomic Nitrogen N2 in the SCR, during lean operation.

According to a first aspect of the invention there is provided a method of operating a diesel engine system having LNT and SCR aftertreatment devices arranged in series. The LNT and SCR devices receive exhaust gas from the engine. The method comprises operating the engine in lean and rich combustion modes and switching between the lean combustion mode and the rich combustion mode based upon the operating requirements of the LNT and the SCR. The operating requirements seek to minimize NOx emissions from the engine using a rich early injection combustion mode when the engine is operating in the rich combustion mode.

This has the advantage of synergistic use in which the disadvantage of the LNT (production of NH3) and the disadvantage of the SCR device (need for NH3) are put together, to the advantage of both. Furthermore, the rich early injection combustion mode creates greater quantities of NH3. In addition rich combustion can take place for a longer period of time. This may further increase the quantities of NH3 generated. The SCR device may thus be provided with viable quantities of NH3.

The method may further comprise using a lean early injection combustion mode for the lean combustion mode.

The engine may be operated in the lean combustion mode until a stored quantity of nitrates in the LNT reaches a predefined upper limit and then may be switched to the rich combustion mode to reduce the nitrates.

The engine may be operated in the lean combustion mode until a supply of ammonia stored in the SCR device reaches a predefined lower limit and then may be switched to the rich combustion mode to generate ammonia in the LNT for storage in the SCR.

The method may further comprise operating the engine in the rich combustion mode until a supply of ammonia stored in the SCR reaches a predefined upper limit and/or a stored quantity of nitrates in the LNT reaches a predefined lower limit.

The NOx may be stored on the LNT as nitrate(s).

The method may further comprise injecting the fuel in a single injection of fuel. The method may further comprise injecting the fuel in a plurality of discrete injections of fuel, e.g. during rich early injection or lean early injection.

The method may further comprise injecting the majority of the fuel to be injected before combustion starts. The method may further comprise injecting substantially all of the fuel to be injected before combustion starts.

The method may comprise recirculating a portion of the engine exhaust to an inlet of the engine. The method may further comprise increasing the portion of the engine exhaust that is recirculated during rich early injection such that the portion of the engine exhaust that is recirculated may be more than 50% of the exhaust from the engine. The portion of the engine exhaust that is recirculated may be greater than or equal to substantially 70% of the exhaust from the engine.

According to a second aspect of the invention there is provided an engine system comprising a diesel engine, a LNT arranged to receive exhaust gas from the engine, a SCR arranged to receive exhaust gas that has previously been treated by the LNT and an electronic controller to control the operation of the engine. The electronic controller is operable to operate the engine in lean and rich combustion modes. The electronic controller is operable to switch the engine between the lean combustion mode and the rich combustion mode based upon the operating requirements of the LNT and the SCR to minimize NOx emissions from the engine. The electronic controller is operable to use a rich early injection combustion mode when the engine is operating in the rich combustion mode.

The electronic controller may be further operable to use a lean early injection combustion mode when the engine is operating in the lean combustion mode.

The electronic controller may operate the engine in the lean combustion mode until a stored quantity of nitrates in the LNT reaches a predefined upper limit. The electronic controller may then switch to the rich combustion mode to reduce the nitrates.

The electronic controller may operate the engine in the lean combustion mode until a supply of ammonia stored in the SCR reaches a predefined lower limit. The electronic controller may then switch the engine to the rich early injection combustion mode to generate ammonia in the LNT for storage in the SCR.

The electronic controller may be further operable to operate the engine in the rich early injection combustion mode until a supply of ammonia stored in the SCR reaches a predefined upper limit and/or a stored quantity of nitrates in the LNT reaches a predefined lower limit. The electronic controller may then switch operation of the engine to the lean combustion mode.

The stored quantity of nitrates in the LNT may be a stored quantity of NOx. The electronic controller may be further operable to inject the fuel in a single injection of fuel. The electronic controller may be further operable to inject the fuel in a plurality of discrete injections of fuel, e.g. during rich early injection or lean early injection.

The electronic controller may be further operable to inject the majority of the fuel to be injected before combustion starts. The electronic controller may be further operable to inject substantially all of the fuel to be injected before combustion starts.

The engine system may be configured to recirculate a portion of the engine exhaust to an inlet of the engine. The electronic controller may be further operable to increase the portion of the engine exhaust that is recirculated during rich early injection. The portion of the engine exhaust that is recirculated may be more than 50% of the exhaust from the engine. The portion of the engine exhaust that is recirculated may be greater than or equal to substantially 70% of the exhaust from the engine.

According to a third aspect of the invention there is provided a motor vehicle having an engine system constructed in accordance with said second aspect of the invention.

Figure 1:
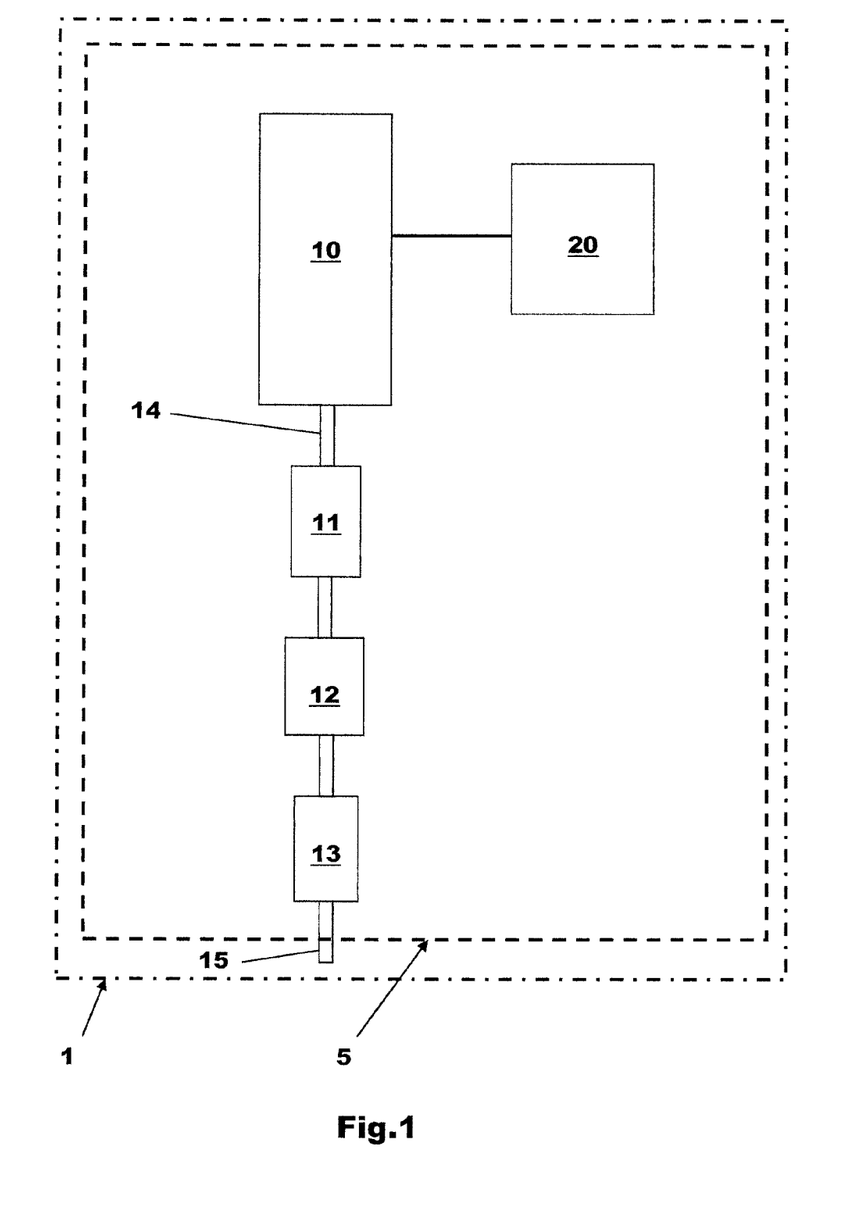
FIG. 1 is a schematic diagram of a motor vehicle according to a third aspect of the invention having an engine system according to a second aspect of the invention.

With particular reference to FIG. 1 there is shown a motor vehicle 1 having an engine system 5.

The engine system 5 comprises a diesel engine 10, a lean NOx trap (LNT) 11, a diesel particulate filter (DPF) 12, a passive selective catalyst reduction device (SCR) 13 and an electronic controller 20.

Exhaust gas from the engine 10 flows via an exhaust system 14 into the LNT 11, from the LNT to the DPF 12, from the DPF 12 to the SCR 13 and then out to atmosphere via a tailpipe 15 of the exhaust system 14.

The LNT 11, DPF 12 and SCR 13 are constructed in a conventional manner using materials well known in the art.

In addition to the above mentioned components, an oxidation catalyst (not shown) may also be provided. The oxidation catalyst may be a separate component or the oxidation catalyst may form part of the LNT 11.

As shown, the DPF 12 and SCR 13 may be separate components. However, the DPF 12 and SCR 13 may be combined such that they are provided as a single component. The engine 10 is operable in two primary combustion modes, a lean operating mode in which the combustion mixture is lean of stoichiometric ($\lambda$>1.001 up to 5) and a rich operating mode in which the combustion mixture is rich of stoichiometric ($\lambda$<0.700 to 0.995).

When operating in the rich operating mode the engine 10 is controlled by the electronic control unit 20 to operate in an early injection mode and the resulting combustion mode is hereinafter referred to as Rich Early Injection (REI).

When operating in the lean operating mode the engine 10 is controlled by the electronic control unit 20 to operate in an early injection mode and the resulting combustion mode is hereinafter referred to as Lean Early Injection (LEI).

Figure 4:
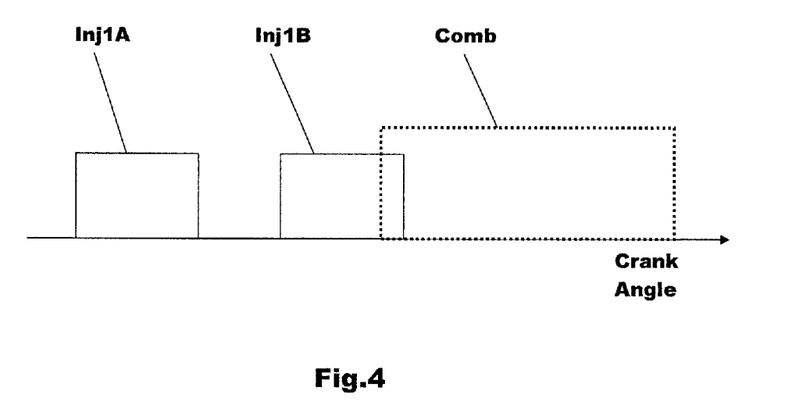
FIG. 4 is a schematic diagram showing possible fuel injection and combustion scenarios utilizing rich early fuel injection combustion in accordance with this invention.
Figure 5:
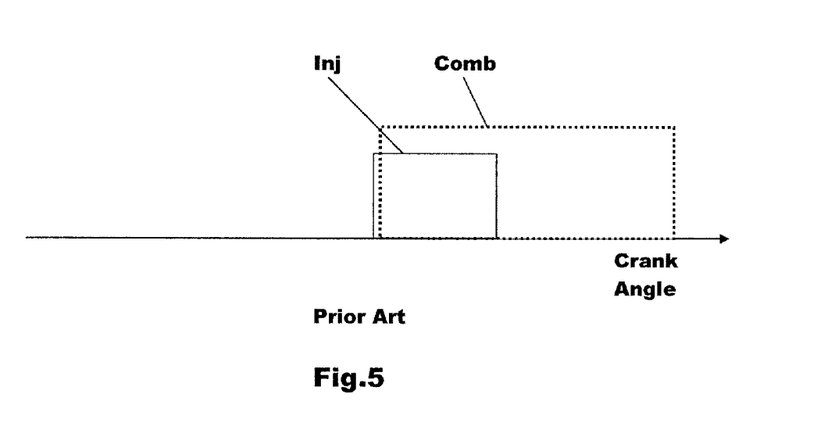
FIG. 5 is a schematic diagram similar to FIG. 4 but showing conventional fuel injection and combustion.

A common feature between LEI and REI is that the injection of diesel fuel starts well before combustion commences, thereby permitting good premixing of the fuel air mixture before combustion commences. With reference to FIGS. 4 and 5 the primary difference between conventional diesel fuel injection combustion (sometimes referred to as CIDI) shown in FIG. 5 and LEI or REI shown in FIG. 4 is that with conventional fuel injection combustion, the fuel is injected at the same time that combustion is taking place (as indicated by the injection event 'Inj' and combustion event 'Comb' on FIG. 5).

Whereas, in the case of LEI or REI the injection is preferably completed before combustion starts (as indicated by the injection event 'InjA' and combustion event 'Comb' on FIG. 4). Accordingly, in one example, all or substantially all of the fuel to be injected (e.g. in that combustion cycle) is injected before combustion starts.

However, a beneficial effect is also obtained if there is a small overlap between the end of the injection event and the commencement of combustion (as indicated by the injection event 'InjB' and combustion event 'Comb' on FIG. 4). Such an overlap may be desirable since it may reduce the rate at which the pressure in the combustion chamber increases, which may in turn reduce the noise generated. Accordingly, in one example, the majority of the fuel to be injected may be injected before combustion starts. In a particular example, at least substantially 90% of the fuel to be injected may be injected before combustion starts. In a further example, at least substantially 95% of the fuel to be injected may be injected before combustion starts.

Therefore in the case of REI or LEI the majority of the energy produced by combustion occurs after the injection event has finished and the combustion mixture is well mixed before the combustion event starts. Premixed Charge Compression Ignition (PCCI) is one example of such an early injection operating mode.

The fuel may be injected in a single injection, e.g. pulse. However, as depicted in FIG. 4, the fuel to be injected may be injected over two or more discrete injections, e.g. pulses. The fuel may be injected in multiple injections during REI or LEI, but may otherwise be injected in a single injection. In the case of there being multiple injections, the last injection may or may not overlap with the commencement of combustion as mentioned above. Multiple injections may improve the mixing of the fuel and air.

The injection of the fuel may begin at any point after a crank arm associated with a respective piston and combustion chamber is at 40° before the crank arm reaches Top Dead Centre (TDC). In the case of a single injection, the injection of the fuel may begin when the crank arm is at 30° before TDC. In the case of multiple injections, the injection of the fuel may begin when the crank arm is at 40° before TDC. Combustion may begin when the crank arm is at approximately 3° after TDC. As mentioned above, all or substantially all of the fuel to be injected may be injected before combustion starts. However, the fuel injection may be complete shortly before, at, or after the crank arm is at approximately 3° after TDC. For example, the fuel injection may be complete when the crank arm is in the range from 2° before TDC to 8° after TDC. On the other hand, it will be appreciated that the fuel injection may be complete at crank angles outside this range, in particular crank angles before this range, e.g. before the cranks reaches 2° before TDC.

Although not depicted, Exhaust Gas Recirculation (EGR) may be applied to the engine 10 such that a portion of the engine exhaust is recirculated to an inlet of the engine. The amount of EGR may be controlled by an EGR valve (not shown), which may in turn be controlled by the electronic controller 20.

During REI or LEI, the portion of the engine exhaust that is recirculated may be increased. For example, an EGR ratio, which is defined by the recirculated mass flow rate as a percentage of the total mass flow rate into the diesel engine 10, may be increased to more than 50%, e.g. approximately 70% or more, during REI or LEI. The EGR ratio may otherwise not exceed 50% and may typically be approximately 20-30% during conventional fuel injection combustion.

Increasing the EGR ratio permits a further reduction in the NOx emissions thanks to the improved mixing of REI or LEI and the resulting lower flame temperature. However, increasing the EGR ratio to such high rates has not previously been possible due to misfiring and high soot problems. Advantageously, the REI or LEI mode described above provide enhanced mixing that overcome these problems and permit greater EGR ratios and thereby reduced NOx emissions.

The enhanced levels of EGR may also maintain or reduce combustion noise levels, which might otherwise have increased with a REI mode. The above described REI mode may also permit relatively low exhaust temperatures compared to other rich injection modes. In addition, the above described REI mode may have little or no detrimental effect on specific fuel consumption compared with a lean injection mode.

In short, the REI mode of the present invention improves the efficiency of the aftertreatment system without having a detrimental effect on the specific fuel consumption, soot levels or combustion noise.

Operation of the engine system 5 is as follows.

Whenever possible the engine 10 is operated by the electronic controller 20 in LEI as this produces the least emissions and uses the minimum amount of fuel.

Figure 2:
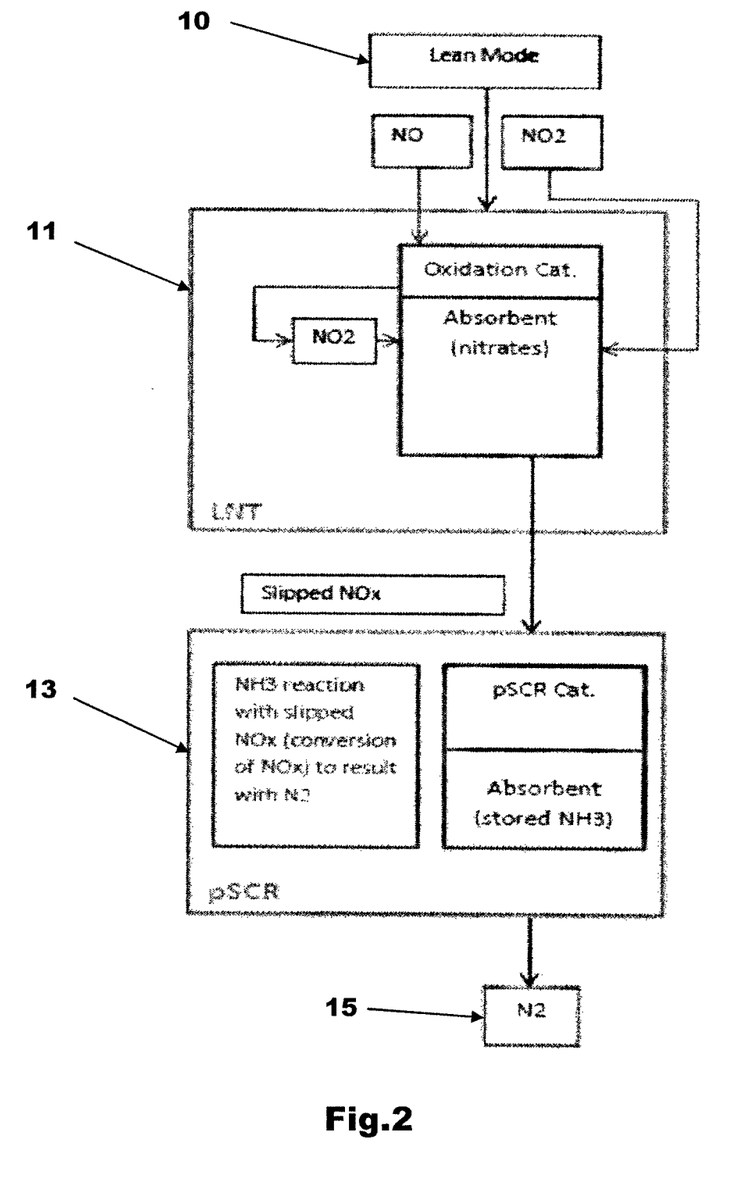
FIG. 2 is a schematic diagram showing the operation of a LNT and SCR forming part of the engine system shown in FIG. 1 during a lean combustion event.

During engine combustion using LEI Nitrogen Monoxide (NO) and Nitrogen dioxide NO2 are produced by the engine 10 as a by-product of the combustion process and these enter the LNT 11 from the exhaust system 14.

In the LNT 11 the NO is reacted in an oxidation catalyst utilizing PGM catalyst material to produce NO2 which is absorbed or stored along with the NO2 produced by the engine 10 as nitrates in the LNT.

Any NOx not removed by the LNT 11 flows through the DPF 12 to the SCR 13. In the SCR 13 this slipped NOx can be reacted with Ammonia (NH3) stored in the SCR 13 as described hereinafter. The NH3 is released when the temperature within the SCR 13 exceeds 180° C. and the use of LEI is able to produce such a temperature even when the engine 10 is operating at a very light load which is not the case with conventional lean combustion.

Although in accordance with this invention it is preferable for the engine 10 to be operated in LEI during this lean combustion phase of operation so as to maximize the reduction in emissions and use less fuel due to better fuel mixing it will be appreciated that it would also be possible to operate the engine 10 lean using conventional injection timing during this lean combustion phase of operation.

At some point in time the stored quantity of nitrates in the LNT reaches a predefined upper limit and the stored nitrates will need to be reduced. The electronic controller 20 may then be operable to switch the combustion mode from lean combustion to the REI mode of combustion shown in FIG. 3. Similarly, the NH3 stored in the SCR 13 may be used up and so may need to be replenished in order to continue the reaction of the NH3 with the slipped NOx from the LNT 11. The electronic controller 20 may then be operable to switch the combustion mode from lean combustion to the REI mode of combustion shown in FIG. 3. The electronic controller 20 may be operable to switch the combustion mode from lean combustion to the REI mode of combustion when the stored quantity of nitrates in the LNT reaches a predefined upper limit and/or the NH3 stored in the SCR 13 is used up.

Figure 3:
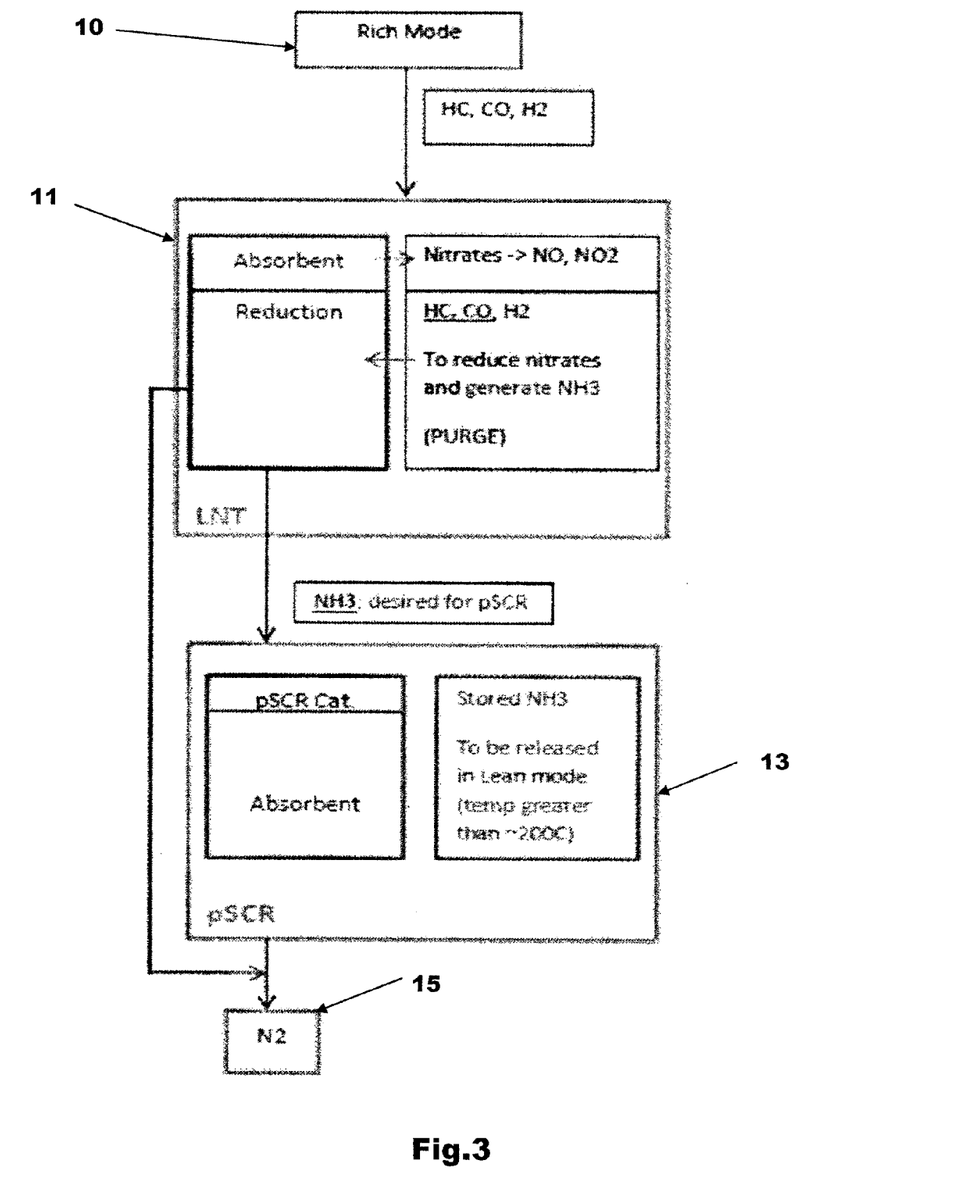
FIG. 3 is a schematic diagram showing the operation of the LNT and SCR forming part of the engine system shown in FIG. 1 during a rich early injection combustion event according to the invention.

When the engine 10 is operating in the REI combustion mode, HC, CO and H2 are produced as by-products of combustion and the quantities of these by-products is increased compared to operation using conventional diesel fuel injection. However, the use of REI produces considerably less soot than if conventional diesel direct fuel injection is used due to the fact that the mixture is well mixed before combustion commences. The pre-mixing of the fuel and air smooth out variations in air/fuel ratio within the mixture during combustion compared to a conventional diesel direct fuel injection process where, locally, the combustion mixture varies considerably in air/fuel ratio. The very rich portions of the mixture in the case of a conventional diesel direct fuel injection process are primarily responsible for the production of soot due to incomplete combustion and so by using REI the amount of soot produced is considerably reduced and may even be substantially eliminated.

The HC, CO and H2 react in the LNT 11 with the stored nitrates and reduce the nitrates to produce NH3. One advantage of the invention is that the quantity of NH3 produced is higher than if a conventional diesel direct fuel injection process is used due to the increased levels of HC, CO and particularly H2 produced by using REI.

The NH3 generated in the LNT 11 flows to the SCR 13 where it is stored for use when the next lean combustion phase takes place.

Because the use of REI produces considerably less soot than a conventional diesel direct fuel injection process, operating the engine 10 rich using REI can be used for a longer period of time than is the case with a conventional diesel direct fuel injection process. Alternatively, the size of the DPF 12 can be made smaller thereby making it easier to package and potentially less expensive to produce.

The use of REI has a number of additional advantages, firstly, because rich operation of the engine 10 can be used for a much longer period of time, it is possible to use a LNT 11 having less PGM loading which provides a considerable cost saving. The requirement for less PGM material may also permit the LNT 11 to be made smaller thereby allowing it to be packaged more easily on the motor vehicle 1. In addition the back pressure from the aftertreatment system will be reduced, allowing improved performance, better fuel economy and lower CO2 emissions from the vehicle.

Not only does the use of REI increase the amount of NH3 that is produced in the LNT 11 by the reaction with the exhaust gas from the engine 10 due to the higher levels of HC, CO and particularly H2, because rich operation of the engine 10 can be used for a much longer period of time the volume of NH3 can be further increased. The LNT 11 can therefore be optimized to produce the required amount of NH3 by: varying the amount of PGM and based materials used; adjusting the air/fuel ratio (e.g. the equivalence ratio, λ) and/or the time the engine 10 is operated by the electronic controller 20 in the REI combustion mode.

As a consequence of the increased NH3 production by the LNT 11 during rich operation, the engine 10 can potentially be operated for a longer period of time in a lean operation if more NH3 is stored in the SCR 13 during rich operation.

Although the electronic controller 20 as described above controls the injection of fuel into the engine 10 so as to enable the engine 10 to be operated in the REI and LEI modes it will be appreciated that the actual fuel injection control could be done by a separate fuel injection controller and the electronic controller 20 would then operate to determine when LEI or REI is required and to command the fuel injection controller to provide such combustion conditions. Accordingly, it will be appreciated that the controller 20 may comprise one or more separate controllers.

Figure 6:
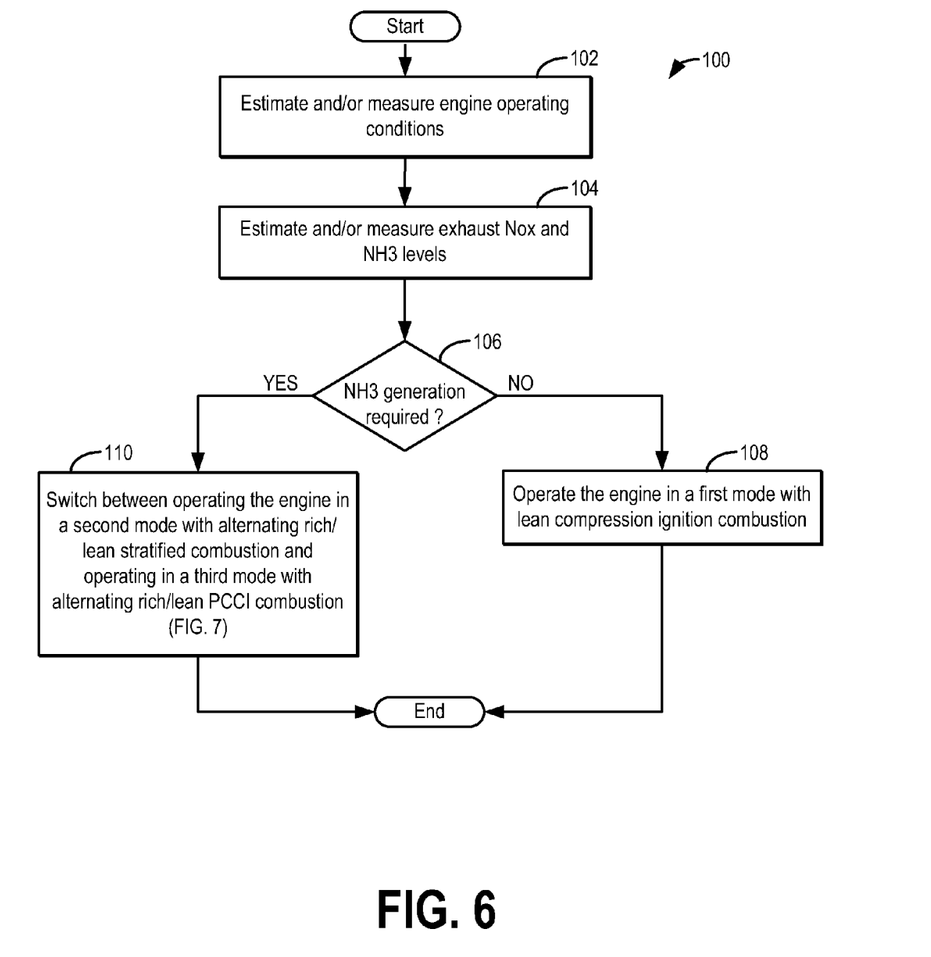
FIG. 6 is a high level flow chart showing the basic operations in accordance with a method of operating a diesel engine system having LNT and SCR aftertreatment devices according to a first aspect of the invention.

Referring now to FIG. 6 a routine 100 is depicted to show the steps of a method of operating a diesel engine with a LNT and SCR in series. Specifically, routine 100 enables the adjustment of the engine mode of operation in view of an estimated/measured NOx level and/or an estimated/measured NH3 level to reduce emissions from a diesel engine.

At 102, engine operating conditions may be measured and/or estimated. These may include, for example, engine speed, exhaust temperature, engine coolant temperature, exhaust catalyst temperature (such as the temperature of the exhaust SCR catalyst and/or the exhaust LNT), operator torque demand, etc.

At 104, exhaust emissions levels, including exhaust NOx levels may be measured and/or estimated. In addition, an amount of ammonia (NH3) stored in the exhaust may be determined. This includes estimating levels of NH3 stored on the exhaust SCR catalyst, as well as any ammonia puddles in the exhaust passage. Estimating exhaust NOx and NH3 levels may include, for example, direct measurement of tailpipe emissions, direct measurement of O2 levels exiting the LNT, modelling of nitrates generated by the LNT, modelling of nitrates reduced during last rich operating phase, elapsed time since last REI combustion phase, modelling of NH3 usage based upon quantity of slipped NOx being produced, modelling of NH3 stored during last rich operating phase, etc. In one example, the output of one or more exhaust NOx sensors located upstream and downstream of the exhaust SCR catalyst may be used to estimate or infer exhaust NOx levels and NH3 levels.

Figure 9A:
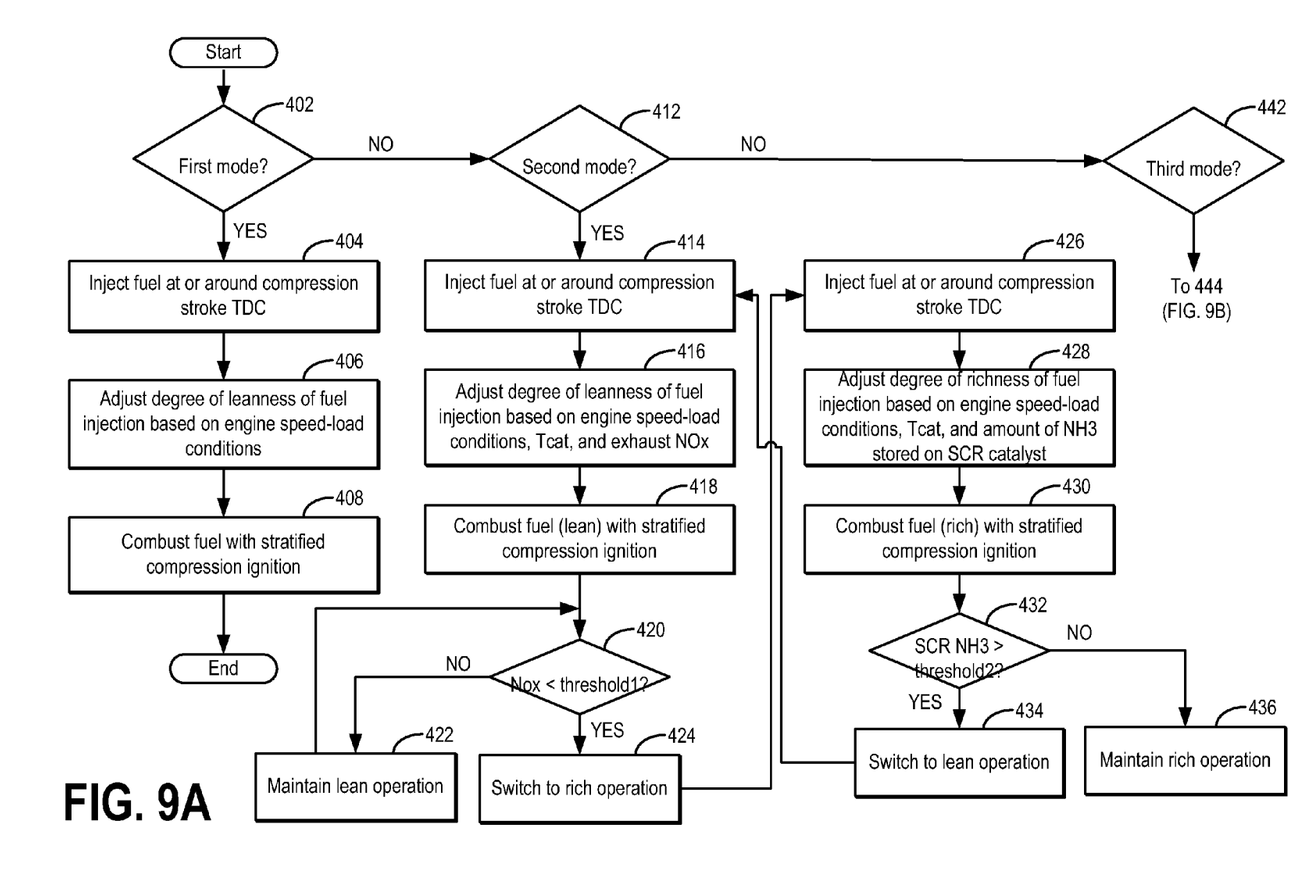
FIGS. 9A & B is a routine detailing engine operation in lean stratified combustion, rich/lean stratified combustion, and rich/lean early ignition combustion.

At 106, the routine may determine whether NH3 generation is required. For example, it may be determined if the NH3 level stored on the exhaust SCR catalyst is sufficient to enable the SCR catalyst to reduce exhaust NOx. If no NH3 generation is required, such as when the NH3 storage level on the SCR catalyst is higher than a threshold level, the routine may proceed to 108 and operate the engine in a first mode with lean compression ignition combustion. As elaborated at FIG. 9, engine operation in the first mode includes delivering fuel at or around compression stroke TDC and then combusting the fuel lean using compression ignition. In an alternate example, if the additional NH3 required by the SCR catalyst is less than a threshold amount, the routine may operate the engine in the first mode.

If, at 106, it is determined that further NH3 generation is required, such as when the NH3 level on the SCR catalyst is lower than the threshold level, or when the additional NH3 required is more than a threshold amount, the routine proceeds to 110 to operate the engine in one of a second or third mode wherein rich and lean engine combustion is alternated. Specifically, engine operation is selected between an alternating rich/lean stratified combustion and an alternating rich/lean PCCI combustion. In both the second and third modes, engine operation is alternated between a lean combustion phase where ammonia stored on the SCR catalyst is used to reduce NOx species and a rich combustion phase where ammonia is generated and stored on the SCR catalyst for consumption during the subsequent lean phase. As elaborated with reference to FIG. 2, a controller may select one of the second and third modes in response to the need for ammonia generation based on various parameters such as engine speed-load conditions, engine temperature conditions, exhaust catalyst temperature conditions, and NH3 loading conditions. Further, based on a change in engine operating conditions, the controller may transition between the second and third modes.

Figure 7:
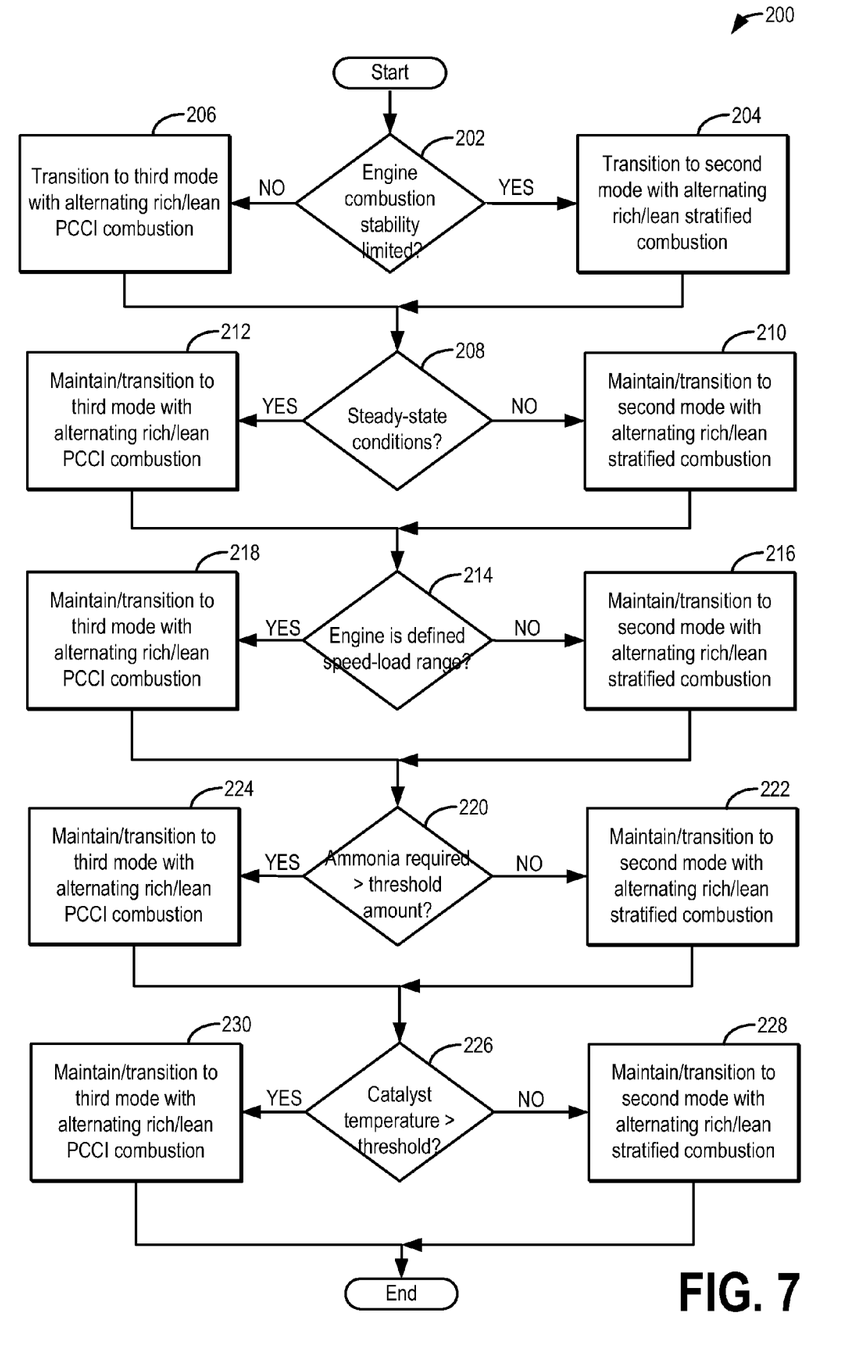
FIG. 7 is a high level flow chart showing the selection between engine operations with a rich/lean stratified combustion and a rich/lean early ignition combustion.

Turning to FIG. 7 a routine 200 is illustrated for selecting between engine operation in the second mode with alternating rich/lean stratified combustion and engine operation in the third mode with alternating rich/lean PCCI combustion. The routine further enables a controller to determine whether and when to transition between operating in the second and third modes. The engine controller may be further configured to perform the steps of a transition routine elaborated at FIG. 8 when transitioning between the second and third modes during the routine of FIG. 7.

At 202, the routine determines if the engine is combustion stability limited. For example, it may be determined if the engine is operating close to combustion stability limits. In one example, the engine may be combustion stability limited during cold engine conditions (such as during a cold start). As such, PCCI combustion may only be performed if combustion stability issues are not present. If the engine is combustion stability limited, the routine may proceed to 204 and select the second mode of operating with alternating lean/rich stratified combustion. Else if the engine is not combustion stability limited, the routine may proceed to 206 and select the third mode of operating with alternating lean/rich PCCI combustion.

It will be appreciated that while steps 204-206 depict selecting between the second and third modes based on engine combustion stability limits, in alternate examples, the controller may transition between the second and third modes based on engine combustion stability limits. For example, in response to a drop in combustion stability while operating in the second mode, the controller may transition to the third mode. As another example, in response to an improvement in combustion stability while operating in the third mode, the controller may transition to the second mode.

From each of 204 and 206, the routine proceeds to 208 where the routine may determine if the engine is operating under steady-state conditions. For example, it may be determined that there are no frequent pedal tip-ins and tip-outs. As such, PCCI combustion may only be performed during conditions when there are limited transients. If steady-state conditions are not confirmed, but instead transient conditions are determined, the routine proceeds to 210 to maintain operation in the second mode (if already operating in the second mode, such as at 204) or transitioning to the second mode (if already operating in the third mode, such as at 206). As discussed above, during the second mode, the engine may perform alternating lean/rich stratified combustion.

If steady-state conditions are confirmed, the routine proceeds to 212 to maintain operation in the third mode (if already operating in the third mode, such as at 206) or transitioning to operation in the second mode (if already operating in the second mode, such as at 204). As discussed above, during the third mode, the engine may perform alternating lean/rich PCCI combustion. If a transition is performed between the second and third modes, a transition routine, such as the routine of FIG. 8, may also be performed to reduce torque disturbances that may occur during the transition.

From both 210 and 212, the routine proceeds to 214 where it may be determined if the engine is within a defined speed-load range. As such, PCCI combustion may only be performed when the engine speed-load conditions are within a specified narrow range, such as low to mid engine speeds and loads. If the engine is operating outside the defined range, the routine may proceed to 216 and maintain or transition to the second mode with alternating lean/rich stratified combustion. Else, if the engine conditions are in the specified range, the routine proceeds to 218 and maintains or transitions to the third mode with alternating lean/rich PCCI combustion. If a transition is performed between the second and third modes, the transition routine of FIG. 8 may be executed to enable a smooth transition.

From both 216 and 218, the routine proceeds to 220 where it may be determined whether the amount of ammonia required on the SCR catalyst is higher than a threshold amount. In one example, the amount of ammonia required may be based on the current NH3 loading of the exhaust SCR catalyst. The threshold amount may be based on the engine's ammonia production capability in the second mode relative to the third mode. As such, during operation in the third mode, the early injection of fuel (during rich operation) allows for a longer duration of rich combustion, and thereby a larger amount of ammonia production. In comparison, during operation in the second mode, the shorter duration of rich operation limits the engine ammonia production capability. Thus if the ammonia required to be generated is higher than the threshold amount (that is, higher ammonia requirement), the routine proceeds to 224 to maintain or transition to the third mode with alternating lean/rich PCCI combustion. Else, if the ammonia required is lower than the threshold amount (that is, lower ammonia requirement), the routine proceeds to 222 to maintain or transition to the second mode with alternating lean/rich stratified combustion. If a transition is performed between the second and third modes, the transition routine of FIG. 3 may be executed to reduce disturbances during the transition.

It will be appreciated that while step 220 shows assessing exhaust NH3 levels, in further examples, step 220 may additionally or alternatively include assessing whether exhaust NOx levels are at a predefined threshold. For example, the second mode may be selected if exhaust NOx levels are lower while the third mode may be selected if exhaust NOx levels are higher.

From both 222 and 224, the routine proceeds to 226 to determine whether the catalyst operating temperature is below a threshold temperature. If not, the routine may proceed to 228 and maintain or transition to operation in the second mode with alternating lean/rich stratified combustion. Else, the routine may proceed to 230 and maintain or transition to operation in the third mode with alternating lean/rich PCCI combustion. As such, PCCI combustion may be sensitive to exhaust catalyst temperatures and may require sufficient catalyst heating to be performed. If a transition is performed between the second and third modes, the transition routine of FIG. 8 may be executed to reduce torque disturbances during the transition.

Figure 8:
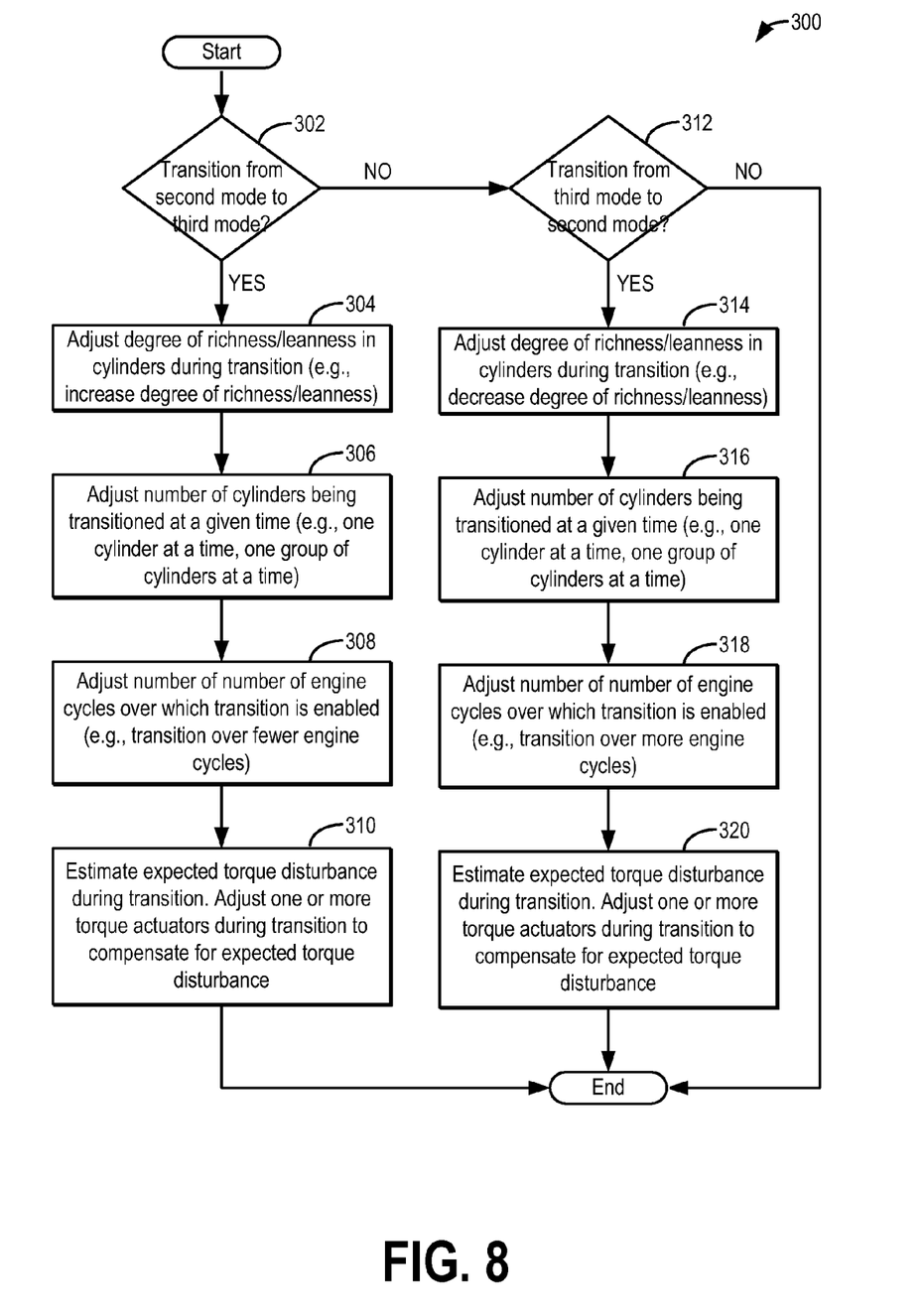
FIG. 8 is a transition routine between engine operation with a rich/lean stratified combustion and a rich/lean early ignition combustion.

Now turning to FIG. 8, a transition routine 300 is illustrated for when the engine transitions between alternating lean/rich stratified combustion (second mode) and alternating lean/rich PCCI combustion (third mode). Specifically routine 300 adjusts the running conditions of the engine based on the lean/rich engine operating mode. Routine 300 may be performed as part of routine 200, such as during a transition from the second mode to the third mode, or vice versa.

At 302, the routine may confirm if a transition from the second mode to the third mode has occurred. For example, it may be determined if a transition has occurred during the execution of routine 200 at 212, 218, 224, or 230. If not, the routine may proceed to 312. If yes, the routine may proceed through 304, 306, 308 and 310.

If a transition into the third mode is confirmed, at 304, the routine may adjust the degree of richness and/or leanness in the cylinders during the alternating rich/lean operation. In one example, when transitioning from the second mode to the third mode, the adjusting may include increasing a degree of richness of the rich operation and increasing a degree of leanness of the lean operation since the early injection of the third mode allows for a longer duration of rich/lean operation.

At 306, the routine may adjust the number of cylinders to be transitioned from the second mode alternating rich/lean stratified combustion to the third mode rich/lean PCCI combustion. This may include, for example, transitioning one cylinder at a time, or transitioning multiple cylinders at a time. The cylinder selection may be based on firing order, location on engine bank, engine manifold configuration, etc. The cylinder selection may be further based on the conditions of an exhaust SCR catalyst coupled downstream of the cylinder (e.g., on the same bank in multi-bank engines). In one example, where cylinders are gradually transitioned, the engine may operate with some cylinders in the second mode alternating rich/lean stratified combustion and other cylinders operating in the third mode alternating rich/lean PCCI combustion.

In one example, the engine may be an in-line four-cylinder engine and the transition may include transitioning a first firing cylinder, followed by a second, then a third, and then the fourth. In another example, the first two cylinders to fire may be transitioned followed by the next two cylinders. In another example, all the engine cylinders may be simultaneously transitioned. In an alternate example, the engine may be a six-cylinder V-engine and the transition may include transitioning a first firing cylinder on a first bank, followed by a first firing cylinder on a second bank, and then a second firing cylinder on the first bank, and so on. In another example, the first firing cylinder on both engine banks may be transitioned simultaneously, and then the second firing cylinders and so forth. In another example, all the engine cylinders of a given bank may be simultaneously transitioned.

At 308, the routine may adjust the number of engine cycles over which the transition is to be completed. For example, it may be determined if the engine mode is to be transitioned over a given engine cycle or multiple engine cycles. In one example, when transitioning from the second mode to the third mode (where longer duration of combustion is possible), the number of engine cycles over which the transition is performed may be increased or decreased depending on the amount of ammonia stored in the SCR device.

At 310, the routine includes adjusting one or more engine torque actuators during the transition from the second mode to the third mode to compensate for any expected torque disturbances. The adjustment may be based on an expected torque output of the engine during operation in the second mode relative to the expected torque output of the engine during operation in the third mode. The torque actuators adjusted may include one or more an intake throttle, an EGR valve, boost level, etc. The adjusting may include increasing an opening of the intake throttle in anticipation of a torque drop or decreasing an opening of the intake throttle in anticipation of a torque surge.

Returning to 302, if a transition from the second mode to the third mode is not confirmed, then at 312, the routine may confirm if a transition from the third mode to the second mode has occurred during routine 200, such as at 210, 216, 222, or 228. If not, the routine may end. If yes, the routine may proceed through 314, 316, 318, and 320.

If a transition into the second mode is confirmed, at 314, the routine may adjust the degree of richness and/or leanness in the cylinders during the alternating rich/lean operation. In one example, when transitioning from the third mode to the second mode, the adjusting may include decreasing or increasing a degree of richness of the rich operation and decreasing a degree of leanness of the lean operation since the early injection of the third mode allows for a longer duration of rich/lean operation.

At 316, the routine may adjust the number of cylinders to be transitioned from the third mode alternating rich/lean PCCI combustion to the second mode rich/lean stratified combustion. This may include, for example, transitioning one cylinder at a time, or transitioning multiple cylinders at a time. The cylinder selection may be based on firing order, location on engine bank, engine manifold configuration, etc. The cylinder selection may be further based on the conditions of an exhaust SCR catalyst coupled downstream of the cylinder (e.g., on the same bank in multi-bank engines). In one example, where cylinders are gradually transitioned, the engine may operate with some cylinders in the second mode alternating rich/lean stratified combustion and other cylinders operating in the third mode alternating rich/lean PCCI combustion.

In one example, the engine may be an in-line four-cylinder engine and the transition may include transitioning a first firing cylinder, followed by a second, then a third, and then the fourth. In another example, the first two cylinders to fire may be transitioned followed by the next two cylinders. In another example, all the engine cylinders may be simultaneously transitioned. In an alternate example, the engine may be a six-cylinder V-engine and the transition may include transitioning a first firing cylinder on a first bank, followed by a first firing cylinder on a second bank, and then a second firing cylinder on the first bank, and so on. In another example, the first firing cylinder on both engine banks may be transitioned simultaneously, and then the second firing cylinders and so forth. In another example, all the engine cylinders of a given bank may be simultaneously transitioned.

At 308, the routine may adjust the number of engine cycles over which the transition is to be completed. For example, it may be determined if the engine mode is to be transitioned over a given engine cycle or multiple engine cycles. In one example, when transitioning from the third mode to the second mode, the number of engine cycles over which the transition is performed may be decreased.

At 310, the routine includes adjusting one or more engine torque actuators during the transition from the second mode to the third mode to compensate for any expected torque disturbances. The adjustment may be based on an expected torque output of the engine during operation in the second mode relative to the expected torque output of the engine during operation in the third mode. The torque actuators adjusted may include one or more of the following such as an intake throttle, an EGR valve, boost level, etc. The adjusting may include increasing an opening of the intake throttle in anticipation of a torque drop or decreasing an opening of the intake throttle in anticipation of a torque surge.

Figure 9B:
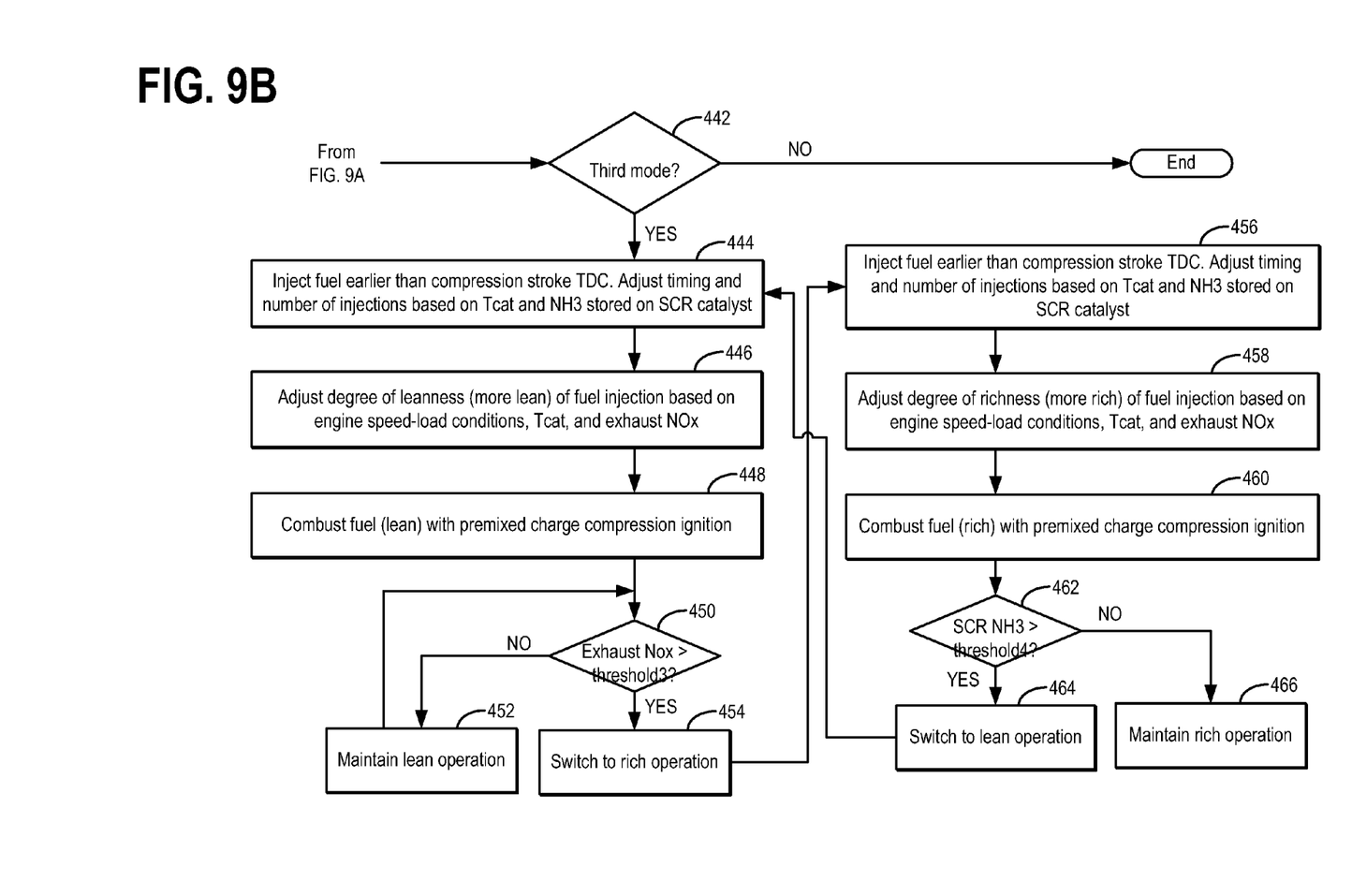

Now turning to FIGS. 9A and 9B, a routine detailing engine operation in the first mode, second mode, and third mode is shown. Specifically the routines of FIGS. 9A-B illustrate a lean stratified combustion (first mode), an alternating lean/rich stratified combustion (second mode) and an alternating lean/rich PCCI combustion (third mode).

At 402, the routine may determine if the first mode is enabled. If not, the routine may proceed to 412. If the first mode is enabled, the routine may proceed through 404, 406 and 408. The first mode is a lean stratified combustion which enables economical running of the engine. The fuel is injected at substantially the same time that combustion is taking place.

At 404, during engine operation in the first mode, fuel is injected at or around compression stroke TDC. As such, a lean fuel injection is delivered. At 406, a degree of leanness of the fuel injection is adjusted based on engine speed-load conditions. For example, as engine speed-load increases, the degree of leanness is increased. At 408, the fuel is combusted with stratified compression ignition and without spark ignition of fuel.

At 412, the routine may determine if the second mode is enabled. If not, the routine may proceed to 442. If the second mode is enabled, the routine may proceed to 414. The second mode is a lean/rich stratified combustion mode. The second mode is depicted as starting with lean stratified combustion.

At 414, fuel is injected into the cylinder at or around compression stroke TDC for a lean stratified combustion. At 416, a degree of leanness of the fuel injection is adjusted based on, for example, engine speed-load conditions, exhaust catalyst temperature (Tcat) and exhaust NOx levels. For example, as the exhaust catalyst temperature decreases or exhaust NOx level decreases, the degree of leanness may be increased. At 418, the delivered fuel is combusted via stratified compression ignition and without spark ignition.

At 420, the routine may determine if the exhaust NOx or LNT nitrate level is greater than a first (upper) threshold level. Alternatively, it may be determined if the NOx level trapped at an exhaust LNT is higher than a threshold requiring nitrate removal. As such, during the rich operation, NH3 stored at the SCR catalyst may be used to regenerate an exhaust NOx trap and reduce exhaust NOx species. The first threshold may be based on a temperature of the exhaust catalyst and an NH3 loading of the SCR catalyst. If the exhaust NOx level is not higher than the first threshold, the routine may proceed to 422 and maintain lean stratified combustion until the exhaust NOx level is greater than the first threshold. Else, once the exhaust NOx level is sufficiently high, the routine may proceed to 424 and switch to rich stratified combustion to generate ammonia for NOx reduction during a subsequent lean operation.

At 420 the routine may additionally or alternatively determine whether the NH3 level in the SCR catalyst is less than a lower threshold.

At 424, the controller may switch engine operation from lean stratified combustion to rich stratified combustion. Specifically, at 426, fuel is injected at or around compression stroke TDC for the rich stratified combustion. At 428, a degree of richness of the fuel injection is adjusted based on, for example, engine speed-load conditions, Tcat and amount of NH3 stored on SCR catalyst. For example, as the exhaust catalyst temperature decreases or SCR NH3 level decreases, the degree of richness may be increased. At 430, the fuel is combusted with stratified compression ignition.

At 432 the routine may determine if the NH3 level in the SCR is greater than a second (upper) threshold level. As such, during the rich operation, NH3 may be generated and stored at the SCR catalyst. If the NH3 level is not greater, the routine may proceed to 436 and maintain rich stratified combustion until the NH3 SCR level is greater than the upper threshold. That is, rich stratified combustion may be continued until sufficient NH3 is stored in the SCR catalyst to enable NOx reduction during a subsequent lean operation. If the NH3 level is greater, the routine may proceed to 434 and switch back to the lean stratified combustion.

At 442, shown in FIG. 4B from FIG. 4A, the routine may determine if the third mode is enabled. If the third mode is not enabled, the routine ends. If enabled, the routine may proceed to 444. The third mode involves alternating lean/rich PCCI combustion. The third mode is shown starting with lean PCCI combustion.

At 444, fuel is injected earlier than the compression stroke. Specifically, fuel is injected as described herein. In one example, all or substantially all of the fuel to be injected is injected before combustion starts. In another example, a small overlap exists between the end of the fuel injection event and the commencement of combustion. Therefore in the case of lean PCCI combustion, the majority of energy produced occurs after the injection event has finished and the combustion mixture is well mixed before the combustion event starts. The fuel may be injected in one pulse or over two or more discrete injections, e.g. pulses. A timing of the fuel injection as well as number of pulses of the fuel injection may be based on engine speed-load conditions, Tcat, exhaust NOx levels, and SCR catalyst ammonia loading. For example, as the SCR catalyst ammonia level increases, the lean fuel injection may be performed earlier than compression stroke TDC.

At 446, a degree of leanness of the fuel injection is adjusted based on, for example, engine speed-load conditions, Tcat, exhaust NOx, and SCR catalyst ammonia loading. For example, as the ammonia loading increases, the degree of leanness may be increased so as to allow for a longer lean PCCI combustion with more NOx reduction. At 448, the lean fuel is combusted with premixed charge compression ignition and not spark ignition.

At 450 the routine may determine if the exhaust NOx or LNT nitrate level is greater than a third threshold (Threshold 3). Alternatively, it may be determined if the NOx level trapped at an exhaust LNT is higher than a threshold requiring nitrate removal. As such, during the rich operation, NH3 stored at the SCR catalyst may be used to regenerate an exhaust NOx trap and reduce exhaust NOx species. The third threshold may be based on a temperature of the exhaust catalyst and an NH3 loading of the SCR catalyst. Further, the third threshold may be higher than the first threshold correspondingly applied during the second mode (at 420). In one example, the third threshold may be determined as a function of the first threshold and the SCR catalyst ammonia level. If the exhaust NOx level is not higher than the third threshold, the routine may proceed to 452 and maintain lean PCCI combustion until the exhaust NOx level is greater than the third threshold. Else, once the exhaust NOx level is sufficiently high, the routine may proceed to 454 and switch to rich PCCI combustion to generate ammonia for NOx reduction during a subsequent lean operation.

At 450 the routine may additionally or alternatively assess whether the NH3 level in the SCR is less than a lower threshold.

At 454, fuel is injected earlier than the compression stroke as previously described for 444. In one example, all or substantially all of the fuel to be injected is injected before combustion starts. In another example, a small overlap exists between the end of the fuel injection event and the commencement of combustion. Therefore in the case of rich PCCI combustion, the majority of energy produced occurs after the injection event has finished and the combustion mixture is well mixed before the combustion event starts. The fuel may be injected in one pulse or over two or more discrete injections, e.g. pulses. A timing of the fuel injection as well as number of pulses of the fuel injection may be based on engine speed-load conditions, Tcat, exhaust NOx levels, and SCR catalyst ammonia loading. For example, as the SCR catalyst ammonia level increases, the rich fuel injection may be performed earlier than compression stroke TDC.

At 456, a degree of richness of the fuel injection is adjusted based on, for example, engine speed-load conditions, Tcat, exhaust NOx and SCR catalyst ammonia loading. For example, as the ammonia loading increases, the degree of richness may be increased so as to allow for a longer rich PCCI combustion with more NH3 production. At 458, the rich fuel injection is combusted via premixed charge compression ignition.

At 462 the routine may determine if the NH3 level in the SCR is greater than a fourth (upper) threshold level. If not, the routine may proceed to 466 and maintain rich PCCI combustion until the NH3 SCR level is greater than the upper threshold. That is, rich PCCI combustion may be continued until sufficient NH3 is stored in the SCR catalyst to enable NOx reduction during a subsequent lean operation. The fourth threshold may be based on a temperature of the exhaust catalyst and an NH3 loading of the SCR catalyst. Further, the fourth threshold may be higher than the second threshold correspondingly applied during the second mode (at 432). In one example, the fourth threshold may be determined as a function of the second threshold and the SCR catalyst ammonia level. If the NH3 level is greater, the routine may proceed to 464 and switch back to a lean PCCI combustion.

Although not shown on FIG. 6 an additional or alternative check or requirement is that sufficient NH3 has been stored in the SCR 13 and if that is the case the method may return from step 140 to step 110 to operate the engine 10 in a lean mode of combustion. It will be appreciated that various techniques could be used to determine when to terminate NH3 production such as, for example and without limitation, direct measurement of tailpipe emissions, modeling of the quantity of NH3 currently stored in the SCR 13, and elapsed time in the REI mode.

Therefore in summary, during engine lean combustion the LNT stores NOx as nitrates and the SCR reacts any slipped NOx from the LNT with NH3 to produce N2. During rich combustion operation of the engine utilizing REI, the nitrates stored in the LNT are released into a gas phase and are subsequently reduced over PGM and particularly Rhodium to produce N2 that generates NH3 and the SCR stores the NH3 for use in reacting with NOx during the engine lean operation.

The use of REI during a rich purge generates high HC, CO and H2 exhaust emissions with a lower fuel economy penalty compared to a conventional rich purge due to improved thermal efficiency. REI produces a shorter combustion duration that occurs approximately at top dead centre (TDC).

In addition, the use of REI for the rich purge of the LNT provides the advantage that NH3 is generated in greater quantities during the rich purge mode compared to conventional rich combustion and this enhances SCR performance during Lean operation by providing more Ammonia to react with any slipped NOx from the LNT.

Potential hardware improvements and advantages include a reduction in the size of the DPF preferably to an optimized one-can solution made possible due to the reduction in soot produced during rich purge conditions when using REI, a reduction in LNT cost due to the improved SCR performance thereby requiring less PGM in the LNT and potential improved lean mode NOx reduction efficiency due to the use of a smaller LNT and DPF thereby permitting the SCR location to be closer to an exhaust outlet from the engine. This exposes the SCR to higher exhaust temperatures (300° C.) which improves its NOx-reducing performance.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. An engine control method, comprising:
adjusting fuel injection to the engine to perform lean stratified combustion in the engine during a first lean stratified combustion mode;
adjusting fuel injection to the engine to perform repeated lean stratified combustion and rich stratified combustion during a second ammonia generation mode; and
adjusting fuel injection to the engine to perform repeated lean pre-mixed compression ignition and rich pre-mixed compression ignition during a third ammonia generation mode.

2. The method of claim 1 wherein the repeated lean and rich operation in the second and third modes includes switching between lean and rich conditions without stoichiometric operation therebetween.

3. The method of claim 1 wherein the rich stratified combustion during the second mode is for a shorter duration than the rich pre-mixed compression ignition combustion of the third mode.

4. The method of claim 3 wherein a duration of the rich combustion in the third mode is adjusted differently responsive to one or more of ammonia storage and generation amounts in the exhaust system than the rich combustion in the second mode.

5. An engine control method, comprising:
adjusting fuel injection to the engine to perform lean stratified compression-ignition combustion during a first lean stratified compression-ignition combustion mode;
adjusting fuel injection to the engine to perform repeated lean stratified compression-ignition combustion and rich stratified compression-ignition combustion during a second ammonia generation mode; and
adjusting fuel injection to the engine to perform repeated lean pre-mixed compression-ignition and rich pre-mixed compression-ignition during a third ammonia generation mode, the second and third modes selected based on ammonia storage levels of an exhaust SCR catalyst.

6. The method of claim 5 wherein the third mode does not include any spark ignition.

7. The method of claim 6 further comprising adjusting timing of fuel injections in the third mode responsive to ammonia storage.

* * * * *